United States Patent
Hoshiba (10) Patent No.: US 9,166,231 B2
(45) Date of Patent: Oct. 20, 2015

(54) LEAD ACID BATTERY ELECTRODE COMPRISING A POROUS CARBON MATERIAL LAYER AND A LEAD ACID BATTERY

(75) Inventor: Koji Hoshiba, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 237 days.

(21) Appl. No.: 13/120,132

(22) PCT Filed: Sep. 17, 2009

(86) PCT No.: PCT/JP2009/066261
§ 371 (c)(1),
(2), (4) Date: Mar. 21, 2011

(87) PCT Pub. No.: WO2010/032785
PCT Pub. Date: Mar. 25, 2010

(65) Prior Publication Data
US 2011/0177392 A1   Jul. 21, 2011

(30) Foreign Application Priority Data

Sep. 22, 2008   (JP) ................. 2008-242655

(51) Int. Cl.
*H01M 4/14* (2006.01)
*H01M 4/62* (2006.01)
(Continued)

(52) U.S. Cl.
CPC .............. *H01M 4/621* (2013.01); *H01M 4/16* (2013.01); *H01M 4/625* (2013.01); *H01M 4/663* (2013.01); *H01M 4/68* (2013.01); *Y02E 60/126* (2013.01)

(58) Field of Classification Search
CPC ......... H01M 4/14; H01M 4/62; H01M 4/583; H01M 4/68
USPC ........... 429/225, 231.8, 245, 7, 217; 252/502, 252/503
See application file for complete search history.

(56) References Cited

U.S. PATENT DOCUMENTS 3,702,265 A * 11/1972 Snyder et al. ............ 29/215
4,507,855 A    4/1985 Moseley et al.
(Continued)

FOREIGN PATENT DOCUMENTS

DE    1100738 B    3/1961
JP    60-28165 A    2/1985
(Continued)

OTHER PUBLICATIONS

Machine Translation of: JP 2008/047452 A, Sakamoto et al., Feb. 28, 2008.*
(Continued)

*Primary Examiner* — Kenneth Douyette
(74) *Attorney, Agent, or Firm* — Birch, Stewart, Kolasch & Birch, LLP (57) ABSTRACT

Disclosed is an electrode for a lead storage battery that has good initial output characteristics and causes little or no reduction in output characteristics after charge-discharge cycle. The electrode comprises an electrode active material layer and a current collector. The electrode active material layer comprises a layer containing a lead-containing material as an electrode active material and a layer containing a porous carbonaceous material as an electrode active material. The electrode satisfies a requirement represented by the following equation: $B/(A+B) \times 100 = 1.0$ to $90.0\%$ wherein A represents the weight of lead atoms contained in the electrode active material layer; and B represents the weight of the porous carbonaceous material contained in the electrode active material layer. The density of the layer containing the porous carbonaceous material is 0.40 to 0.80 g/cm$^3$. Also disclosed is a lead storage battery using the electrode in at least one of a positive electrode and a negative electrode.

10 Claims, 1 Drawing Sheet

(51) Int. Cl.
*H01M 4/68* (2006.01)
*H01M 4/16* (2006.01)
*H01M 4/66* (2006.01)

(56) References Cited

U.S. PATENT DOCUMENTS

| | | | |
|---|---|---|---|
| 5,705,259 A * | 1/1998 | Mrotek et al. | 428/209 |
| 2004/0115530 A1 * | 6/2004 | Maeda et al. | 429/217 |
| 2004/0121237 A1 * | 6/2004 | Kelley et al. | 429/245 |
| 2005/0058907 A1 | 3/2005 | Kurihara et al. | |
| 2006/0269801 A1 * | 11/2006 | Honbo et al. | 429/7 |
| 2008/0003501 A1 * | 1/2008 | Vincze et al. | 429/208 |

FOREIGN PATENT DOCUMENTS

| | | | | |
|---|---|---|---|---|
| JP | 2-44648 A | 2/1990 | | |
| JP | 08180858 A * | 7/1996 | | H01M 4/14 |
| JP | 10-242010 A | 9/1998 | | |
| JP | 11-45719 A | 2/1999 | | |
| JP | 2003-051306 A | 2/2003 | | |
| JP | 2003-331848 A | 11/2003 | | |
| JP | 2007-012596 A | 1/2007 | | |
| JP | 2008-47452 A | 2/2008 | | |
| JP | 2008-146898 A | 6/2008 | | |
| WO | WO 02/05293 A2 | 1/2002 | | |
| WO | WO 2005/027255 A1 | 3/2005 | | |

OTHER PUBLICATIONS

Machine Translation of: JP 08180858 A, Fujita, Kenichi, Jul. 1996.*
International Preliminary Report on Patentability and Translation of the Written Opinion of the International Searching Authority, dated Apr. 19, 2011, for International Application No. PCT/JP2009/066261 (Forms PCT/IB/373 and PCT/ISA/237).
Extended European Search Report for European Application No. 09725909.7, dated Jun. 29, 2012.
International Search Report for International Application No. PCT/JP2009/055821, dated Jun. 16, 2009.
Translation of International Preliminary Report on Patentability and Written Opinion of the International Searching Authority, dated Nov. 9, 2010, for International Application No. PCT/JP2009/055821 (Forms PCT/IB/338, PCT/IB/373 and PCT/ISA/237).
Non-final Office Action dated Sep. 7, 2012 for U.S. Appl. No. 12/934,229.
International Search Report dated Dec. 15, 2009 in International Application No. PCT/JP2009/066261.
Final Office Action in co-pending U.S. Appl. No. 12/934,229, dated Mar. 29, 2013.
Office Action in co-pending U.S. Appl. No. 12/934,229, dated Feb. 27, 2014.
Office Action in co-pending U.S. Appl. No. 12/934,229, dated Sep. 11, 2014.
Notice of Allowance in co-pending U.S. Appl. No. 12/934,229, dated Jan. 20, 2015.

* cited by examiner

LEAD ACID BATTERY ELECTRODE COMPRISING A POROUS CARBON MATERIAL LAYER AND A LEAD ACID BATTERY

TECHNICAL FIELD

The present invention relates to a lead acid battery electrode and a lead acid battery using the electrode thereof.

BACKGROUND ART

The lead acid battery using lead dioxide as the positive electrode active material and lead as the negative electrode active material, and also using sulfuric acid aqueous solution as the electrolyte solution is widely used in the industry since it is cheaper compared to other secondary battery and also since it is suitable for large current discharge. Thus, the importance thereof is not lost even though the high capacity secondary battery such as lithium ion secondary battery or so is popular today, and the study to improve the ability of the lead acid battery is carried out actively.

Recently, there are reports of the technique using activated carbons, in regards with the improvement of the large current discharge characteristic in short period of time, which is the advantage of the lead acid battery and the improvement of cycle characteristics having the large depth of discharge which is the disadvantage of the lead acid battery.

For example, the patent document 1 describes the lead acid battery using the negative electrode having the lead alloy porous body filled with the negative electrode in which 1 to 5 parts by weight of the activated carbon is added with respect to the negative electrode active material. Patent document 1 describes that this lead acid battery can hold high voltage of after 0.5 seconds at −15° C.

Patent document 2 describes the lead acid battery electrode formed with the active material layer comprising the activated carbons, the binder, and the conductive agent on the surface of the lead active material layer as the electrode active material; and Patent document 2 also describes the lead acid battery provided therewith. In Patent document 2, the active material layer comprising the activated carbons, the binder, and the conductive agent are formed by pulverizing the dry kneaded mixture by a cutter mixer, then adhering the obtained powder on the lead active material layer followed by applying the pressure; or it may be formed by mixing the active material, the binder solution, and the conductive agent, then coating the obtained active material layer forming composition on the lead active material layer. Further, Patent document 2 describes that the lead acid battery provided with this lead acid battery electrode exhibit higher power compared to that of conventional lead acid battery.

Patent document 3 describes the lead acid battery negative electrode placed by coating the paste which includes 13% of the lead active material to the one side across the grid shape current collector, and coating the paste which comprises the activated carbon, carbon black, carboxymethylcellulose on the other side across the grid shape current collector. Patent document 3, also describes the lead acid battery provided with said lead acid battery negative electrode. According to Patent document 3, it has good cycle characteristics which simulated the typical charge-discharge cycle in connection with the 42V mild hybrid electric automobile battery.

Patent document 1: JP-A-2003-51306
Patent document 2: JP-A-2007-12596 (corresponding US Patent application Publication No. 2006/269801)
Patent document 3: JP-A-2007-506230 (corresponding US Patent application Publication No. 2007/104981)

SUMMARY OF THE INVENTION

Technical Problems to be Solved by the Invention

As the object of the characteristic improvement in the lead acid battery, for example, when using the lead acid battery for the dispersed power source, it is required to have a resistance against the charge-discharge cycle over a long period. In regards with such object, if the method described in Patent document 1 and Patent document 3 were used, the output characteristics after the charge-discharge cycle were significantly lowered. Also, if the method described in Patent document 2 was used, the initial output characteristic was not sufficient. Therefore, the present invention aims to provide the lead acid battery electrode having good initial output characteristic, and having less lowered output characteristic after the charge-discharge cycle.

Means for Solving the Technical Problems

As a result of keen examination, the present inventor has found that the lead acid battery electrode comprising the electrode active material layer including the lead containing material as the electrode active material (hereinafter it may be referred as "lead active material layer"), the electrode active material layer including the porous carbon material as the electrode active material (hereinafter it may be referred as "porous carbon active material layer"), and the current collector; wherein the weight of lead atoms contained in said electrode active material layer is A, and the weight of the porous carbon material contained in said electrode active material layer is B, then when B/(A+B) and the density of said porous carbon active material layer are within the specific range, the lead acid battery using the lead acid battery electrode thereof attains good buffering effect by the double layer capacity of the porous carbon material active material layer against the rapid chemical change of the lead active material layer and the output characteristic after the charge-discharge cycle is improved. Based on these knowledges, the following present invention was accomplished.

Effects of the Invention

According to the present invention, following [1] to [7] are provided.
[1] A lead acid battery electrode comprising an electrode active material layer including a layer including a lead containing material as an electrode active material and a layer including porous carbon material as an electrode active material, and a current collector; wherein
when a weight of lead atoms contained in said electrode active material layer is A, and a weight of the porous carbon material contained in said electrode active material layer is B, then B/(A+B)×100 is 1.0 to 90.0%,
a density of said layer including the porous carbon material is 0.40 to 0.80 g/cm$^3$.
[2] The lead acid battery electrode as set forth in claim 1, wherein a thickness of said layer including the porous carbon material is 600 μm or less.
[3] The lead acid battery electrode as set forth in claim 1 or 2, wherein said layer including the porous carbon material is the layer formed by spherical composite particles.

[4] The lead acid battery electrode as set forth in any one of claims 1 to 3, wherein said electrode active material layer further comprises a binder.

[5] The lead acid battery electrode as set forth in claim 4, wherein the binder is diene polymer.

[6] The lead acid battery electrode as set forth in claim 4 or 5, wherein said binder has a glass transition temperature of −80° C. to 50° C.

[7] A lead acid battery using the lead acid battery electrode as set forth in any one of claims 1 to 6 to either one of a positive electrode or a negative electrode.

BRIEF DESCRIPTION OF THE DRAWINGS

According to the present invention, the lead acid battery having good initial output characteristic and which maintain the large output even after the charge-discharge cycle compared to the conventional lead acid battery can be provided.

BEST MODE FOR CARRYING OUT THE INVENTION

The lead acid battery electrode of the present invention is characterized by comprising an electrode active material layer comprising a layer including lead containing material as an electrode active material (the lead active material layer) and a layer including a porous carbon material as an electrode active material (the porous carbon active material layer), and a current collector; and when the weight of lead atoms contained in said electrode active material layer is A and the weight of the porous carbon material contained in said electrode active material layer is B, B/(A+B)×100 is 1.0 to 90.0%, and a density of the layer including said porous carbon active material layer is 0.40 to 0.80 g/cm$^3$.

<The Lead Active Material Layer>

In the present invention, the lead active material layer is a layer including the lead containing material as the electrode active material.

In the lead active material layer of the present invention, the ratio of the lead atoms with respect to entire weight of the lead active material layer is preferably 50 wt % or more, and more preferably 70 wt % or more. When the ratio of the lead atoms is within this range, the energy density as the electrode active material layer can be increased.

The lead containing material as the electrode active material according to the present invention is lead and lead compound such as lead dioxide, and lead or so which is used as the active material of usual lead acid battery. As the specific example of the lead containing material, lead monoxide, dilead trioxide, trilead tetraoxide (red lead), lead sulfate or so may be mentioned other than the above mentioned lead dioxide and lead. These lead containing material may be used alone or by suitably selecting the mixture thereof. As for the lead containing material used for the positive electrode, lead dioxide or lead monoxide is preferable; and as for the lead containing material used for the negative electrode, lead monoxide or lead is preferable.

<The Porous Carbon Active Material Layer>

In the present invention, the porous carbon active material layer is the layer including the porous carbon material as the electrode active material.

In the porous carbon material layer of the present invention, the ratio of the porous carbon active material with respect to entire weight of the porous carbon material layer is preferably 50 wt % or more, and more preferably 70 wt % or more. When the ratio of the porous carbon material is within this range, the energy density as the electrode active material layer can be increased.

Since the porous carbon material is used for utilizing the electric double layer capacity, usually it preferably has large specific surface area which can form the boundary having a wider surface even at the same weight. Specifically, the specific surface area is 30 m$^2$/g or more, preferably within the range of 500 to 5,000 m$^2$/g, more preferably within the range of 1,000 to 3,000 m$^2$/g.

The porous carbon material is preferably activated carbon, and specifically the activated carbon of which uses the material such as the phenol type, the rayon type, the acrylic type, the pitch type, or the coconut husk type as the carbon source and carried out with the activation treatment may be mentioned. As for the activation method, a gas activation such as water vapor, carbon dioxide, oxygen or so; and a chemical activation such as potassium hydroxide, phosphoric acid or so may be mentioned. These porous carbon materials may be used alone or by mixing two or more thereof.

The volume average particle diameter of the porous carbon material is 0.1 to 100 μm, preferably 1 to 50 μm, and more preferably 3 to 35 μm. When the volume average particle diameter is within this range, the molding of the electrode is easy and the double layer capacity is also increased; hence it is preferable. The above mentioned porous carbon material may be used alone or two or more thereof may be mixed depending on the type of the electrochemical element. When the porous carbon material is used by mixing, two or more of the electrode active material having the different average particle diameter or the particle diameter distribution may be mixed and used.

Said porous carbon active material layer is preferably the layer comprising the spherical composite particle; and when the short axis diameter is Ls and the long axis diameter is L1, then (L1−Ls)/{(Ls+L1)/2}×100 (hereinafter refer to as the spherical degree) is preferably 40% or less. Further preferably it is 20% or less. Here, the short axis diameter and the long axis diameter is the average value of the 100 arbitrary spherical composite particles measured by the photographic image observing the spherical composite particles using the reflection electron microscope. The smaller the spherical degree is, the closer the shape is to the complete sphere. When the porous carbon active material layer is the layer formed by such composite particle, the input characteristics is improved.

The spherical composite particle of the present invention refers to the aggregated particle of which the pluralities of materials are formed into spherical shape such as the porous carbon material, the materials which may be included described hereinafter or so. Said spherical composite particles only needs to be formed into spherical shape by combining the pluralities of materials such as the porous carbon material, the materials which may be included described hereinafter or so; and the porous carbon material, the materials which may be included described hereinafter does not necessary have to be in the spherical shape.

The density of the porous carbon active material layer is 0.40 to 0.80 g/cm$^3$, and preferably 0.50 to 0.65 g/cm$^3$. When the density of the porous carbon active material layer is within this range, it is preferable since the electrical conductivity and the liquid retentivity of the electrolyte solution is good. When the density of the porous carbon active material layer is less than 0.40 g/cm$^3$, the electrical conductivity is insufficient and the binding between the porous carbon material against each other is insufficient, thus the cycle holding rate is decreased, and the output characteristic after the charge-discharge cycle is deteriorated. When the density of the porous carbon material layer is more than 0.80 g/cm$^3$, the space between the porous carbon materials are reduced, hence the liquid retentivity of the electrolyte solution is reduced and the resistance of the electrolyte solution becomes large, hence the initial output characteristic is reduced and the output characteristic after the charge-discharge cycle is reduced as well.

The density of the porous carbon active material layer can be controlled by the density of the used porous carbon materials. Also, by using those generally having a large specific surface area as the porous carbon material, the density of the porous carbon active material layer can be lowered. Other than that, by changing the specific surface area and the content of the conductive agent described hereinafter, and by changing the molding pressure and the temperatures during the steps of molding the porous carbon active material layer; the density of the porous carbon active material layer can be controlled as well.

The thickness of said porous carbon active material layer is preferably 600 µm or less, and more preferably 200 µm or more and 400 µm or less. By using the lead acid battery electrode having the thickness of the porous carbon active material layer within said range, the output characteristic after the charge-discharge characteristic of the lead acid battery using this electrode can be made larger.

<The Electrode Active Material Layer>

In the present invention, when the weight of the lead atoms contained in the electrode active material is A and the weight of the porous carbon material contained in the electrode active material is B, then B/(A+B)×100 is 1.0 to 90.0%, preferably 1.5 to 70.0%, and more preferably 4.0 to 15.0%. When said B/(A+B)×100 is within this range, the input characteristic after the charge-discharge cycle can be improved. When the value of said B/(A+B)×100 is less than 1.0%, the reduction of the output characteristic after the charge-discharge cycle is large; on the other hand when it is more than 90.0%, the content of the lead atoms becomes too little hence the initial output characteristic becomes small, thus as a result, the output characteristic after the charge-discharge cycle is deteriorated. Here, B/(A+B)×100 is calculated by respectively setting A and B, the total weight of the entire lead atoms contained in the electrode active material layer and the total weight of the porous carbon material contained in the electrode active material layer. The weight of lead atoms contained in the current collector is not included in A. The value of said B/(A+B)×100 can be controlled by controlling the blending ratio of the lead containing material and the porous carbon material in the electrode active material layer. Also, it may be controlled by the thickness of each of the active material layer comprising the lead containing material and the active material layer comprising the porous carbon materials which are described hereinafter.

Said electrode active material layer may include the conductive material aiming to improve the conductivity in the active material layer. As a specific example, the conductive carbons such as furnace black, acetylene black, and ketjen black (registered Trademark of AkzoNobel Corporate); graphite such as natural graphite and artificial graphite; and the carbon fibers such as the polyacrylonitrile type carbon fibers, the pitch type carbon fibers, and the gas phase carbon fibers or so may be mentioned. Among these, the conductive carbon black is preferable, and acetylene black and ketjen black are more preferable.

The volume average particle diameter of the conductive agent is preferably smaller than the volume average particle diameter of the electrode active material, and generally it is within the range of 0.001 to 10 µm, preferably 0.05 to 5 µm and more preferably 0.01 to 1 µm. When the particle diameter of the conductive agent is within this range, the high conductivity can be obtained with less amount being used. These conductive agents may be used alone or by mixing two or more thereof.

The amount of the conductive agent in the electrode active material layer is usually 2 to 20 parts by weight, and preferably 3 to 15 parts by weight with respect to 100 parts by weight of the porous carbon material. When the amount of the conductive agent is within this range, the conductivity is good and the output characteristic after the charge-discharge cycle can be improved.

Said electrode active material layer preferably further comprise the binder. The binder is not particularly limited as long as it exhibits the binding property between the electrode active material and the current collector and holds the conductive structure; however as a specific example, a polymer compound such as fluorinated polymer, diene polymer, acrylate polymer, polyimide, polyamide, polyurethane or so may be mentioned; and preferably halogen polymer and diene polymer, and particularly preferably diene polymer may be mentioned. These binders may be used alone or by mixing two or more thereof.

The halogen polymer is a polymer comprising the monomer unit including halogen atom. Among these, the polymer including the fluoride atom and/or the chloride atom as halogen atom is preferable. As a specific example of the polymer including the fluoride atom and/or the chloride atom; polytetrafluoroethylene, polyvinylidene fluoride, tetrafluoroethylene/perfluoroalkylvinyl ether copolymer, ethylene/tetrafluoroethylene copolymer, ethylene/chlorotrifluoroethylene copolymer, perfluoroethylene/propene copolymer, chlorosulfonated polyethylene, and polychloroprene may be mentioned.

The diene polymer is a copolymer obtained by polymerizing the homopolymer of the conjugated diene or the monomer mixture including the conjugated diene; or the hydrides thereof. The ratio of the conjugated diene in said monomer mixture is usually 30 wt % or more, and preferably 40 wt % or more. As a specific example of the diene polymer, the conjugated diene homopolymer such as polybutadiene, polyisoprene, polychloroprene or so; the conjugated diene copolymer such as butyl rubber; aromatic vinyl/conjugated diene copolymer such as styrene/butadiene copolymer (SBR) which may be carboxy modified; vinyl cyanide/conjugated diene copolymer such as acrylonitrile/butadiene copolymer (NBR); hydrogenated SBR, hydrogenated NBR or so may be mentioned.

The acrylate polymer is the copolymer obtained by polymerizing the homopolymer of acrylic ester or methacrylic ester, or by polymerizing the monomer mixture including thereof. The ratio of the acrylic ester and/or methacrylic ester in said monomer mixture is usually 40 wt % or more, preferably 50 wt % or more and more preferably 60 wt % or more.

Among the above mentioned, as the binder, polytetrafluoroethylene, polychloroprene, chlorosulfonated polyethylene, styrene-butadiene copolymer, acrylonitrile-butadiene copolymer are preferable, and polychloroprene, styrene-butadiene copolymer, acrylonitrile-butadiene copolymer are more preferable from the point that the active material layer having strong binding between the current collector, and having good acid resistance can be obtained.

In the present invention, the glass transition temperature (Tg) of the binder is preferably −80° C. to 50° C., and more preferably −50° C. to 20° C. By having the glass transition temperature (Tg) of the binder within said range, the cracking of the electrode active material layer is prevented, and the lead acid battery of the present invention can be produced efficiently.

The amount of the binder in the electrode active material layer is usually within the range of 1 to 20 parts by weight, and preferably 3 to 15 parts by weight with respect to 100 parts by weight of the porous carbon material. When the amount of the binder is within this range, the electrode physical property is good and the input characteristic after the cycle is improved.

In the present invention, the binder may be included in at least one of the lead active material layer or the porous carbon active material layer which constitutes the electrode active material layer; alternatively it may be included in both, however preferably it is included only in the porous carbon active material layer. Note that, when the binder is included in both of the lead active material layer and the porous carbon active material layer which constitutes the electrode active material layer, the type of the binder may be the same, or it may be different.

Also, said electrode active material layer may include the disperser which aims to disperse the slurry in the production method described in the following. As for the specific example of the disperser, the cellulose type polymer such as carboxymethyl cellulose, methyl cellulose, ethyl cellulose, hydroxypropyl cellulose, and hydroxypropyl methyl cellulose or so and ammonium salts or the alkali metal salts thereof; the ammonium salts or the alkali metal salts of polyacrylic acid or polymethacrylic acid; polyvinyl alcohol, modified polyvinyl alcohol, polyethylene oxide; polyvinyl pyrrolidone, polycarboxylic acid, oxidized starch, phosphoric acid starch, casein, various modified starch, chitin, chitosan derivatives or so can be used. These dispersers can be used alone respectively or it may be used by mixing two or more thereof. Among these, as the disperser, the cellulose type polymer is preferable and carboxymethyl cellulose or the ammonium salts or the alkali metal salts thereof are particularly preferable. The amount of the disperser is not particularly limited, however usually it is within the range of 0.1 to 10 parts by weight, preferably 0.5 to 5 parts by weight, more preferably 0.8 to 2.5 parts by weight with respect to 100 parts by weight of the porous carbon material. By using the disperser, the precipitation and coagulation of the solid portion of the slurry can be surpressed.

Also, said electrode active material layer may include other materials besides the above mentioned lead containing material, the porous carbon material, the conductive agent which is included depending on the needs, the disperser and the binder. Specifically, the surfactant of anionic, cationic, or amphoteric such as nonionic anion or so may be mentioned, which aims to improve the stability of the electrode compositions such as the slurry which will be described in the following. Other than that, the reinforcement material such as polyester fibers, the surfactant such as lignin or so, and barium sulfate or so may be mentioned. The additives selected from oxides, hydroxides, or sulfate of antimon, zinc, cadmium, silver, and bismuth may be used.

<The Production Method of the Electrode Active Material Layer>

The lead acid battery electrode of the present invention may be formed with the electrode active material layer on said current collectors and as long as the current collector has grid shape, it may be a structure filled with the electrode active material layer inside. Filling with the electrode active material layer refers to the status in which the electrode active material layer is introduced at least to a portion of the pores present on the grid. All the active materials do not necessary have to be introduced on to the grid.

Figure 1:
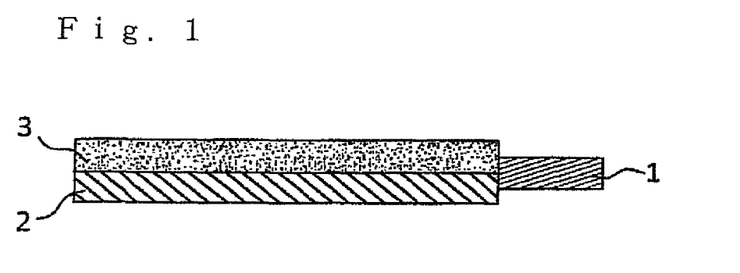
FIG. 1 is a schematic cross section showing one embodiment of the lead acid battery electrode according to the present invention.
Figure 2:
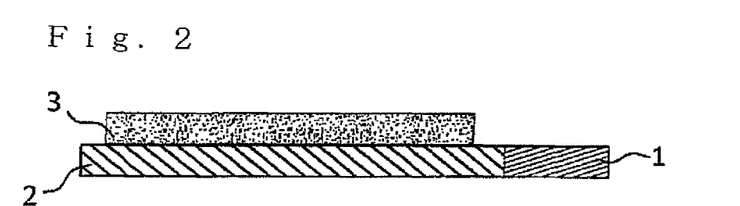
FIG. 2 is a schematic cross section showing one embodiment of the lead acid battery electrode according to the present invention.

As for the lead active material layer and the porous carbon active material layer, one of the active material layer only need to be formed on the at least part of the another active material layer. Specifically, for example, as shown in FIG. 1, on the one surface of the lead active material layer 2 which is filled in the grid shape current collector, the porous carbon active material layer 3 may be formed so as to cover the entire surface of the lead active material layer; or it may be formed on the both surface of the lead active material layer. Alternatively, as shown in FIG. 2, the porous carbon active material layer 3 may be formed on a part of the lead active material layer 2 filled in the grid shape current collector. In the present invention, as shown in FIG. 1, the structure in which on the one surface of the lead active material layer 2 which is filled in the grid shape current collector, the porous carbon active material layer 3 is formed so as to cover the entire surface of the lead active material layer is preferable; since it is easier to produce.

The lead active material layer and the porous carbon active material layer can be formed by the same method as conventionally known methods for producing the lead acid battery electrode. Specifically, the lead containing material or the porous carbon active material, the solvent and other additives are added to produce the active material paste, then this is adhered on to the current collector, or if the current collector is the grid shape current collector it is filled therein; thereby the lead active material layer and the porous carbon active material layer is made.

Besides the above mentioned method, the porous carbon active material layer can be formed by adding the porous carbon material, the conductive agent which is added if needed, the disperser, the binder and other solvent to form the porous carbon active material layer slurry, then by pasting it on the current collector or the lead active material layer.

In case of the present invention, wherein the electrode active material layer comprises the lead active material layer and the porous carbon active material layer, one of the active material layer only needs to be formed at least on the part of the other active material layer; however specifically as this method, the lead active material paste, the porous carbon active material slurry is adhered or filled to the current collector in this order. Alternatively, the lead active material layer can be formed by adhering or filling to the current collector then pasting the porous carbon active material paste thereon. Also, the porous carbon active material layer which is made into the single sheet form molding can be adhered on the lead active material layer.

When the porous carbon active material layer is formed from the spherical composite particle, the single sheet form molding is obtained from the spherical composite particle as mentioned above, then said sheet form molding may be adhered on the lead active material layer; or the spherical composite particle can be supplied on the lead active material layer then by applying the pressure, thereby the porous carbon active material layer can be formed.

When the porous carbon active material layer is formed by the spherical composite particle, since the spherical composite particle can be produced efficiently it is preferably produced by the steps of obtaining the slurry by dispersing the porous carbon active material, the conductive agent and the binder in the solvent, then spray drying said slurry.

<The Step of Obtaining the Slurry>

In the step of obtaining the slurry, above mentioned porous carbon material, the conductive agent which is added if needed, the binder, the disperser and the other additives are dispersed or dissolved in the solvent; thereby the slurry formed by dispersing or dissolving thereof is obtained.

The solvent used for obtaining the slurry is not particularly limited; however when using above mentioned disperser, the solvent which can dissolve the disperser is preferably used. Specifically, generally water is used, but the organic solvent, and the mixed solvent of water and the organic solvent can be used as well. Also, the sulfuric acid which is the electrolyte solution of the lead acid battery can be added in order to control the pH.

The amount of the solvent used for preparing the slurry is usually with in the range of 1 to 70 wt %, and preferably 15 to 60 wt % of the solid portion concentration of the slurry. When the solid portion concentration is within this range, it is suitable since the binder can be dispersed uniformly.

The viscosity of the slurry is usually within the range of 10 to 5000 mPa·s, and preferably 50 to 2000 mPa·s at the room temperature. When the viscosity of the slurry is within this range, the productivity during the spray drying step can be improved.

The methods and means of dispersing or dissolving the porous carbon material, the conductive agent, the binder, the disperser, and other additives in the solvent is not particularly limited. For example, the method of adding thereof into the solvent at once; the method of dissolving the disperser in the solvent then mixing by adding the binder (for example latex) dispersed in the solvent, followed by adding the porous carbon material and the conductive agent then mix; the method of adding the porous carbon material and the conductive agent in to the binder dispersed in the solvent and mix, then adding the disperser dissolved in the solvent to this mixture and mix; may be mentioned. As the means of mixing, for example, the mixing apparatus such as the ball mill, the sand mill, the beads mill, the pigment disperser, the grinder, the ultrasonic disperser, the homogenizer, the homomixer, the planetary mixer or so may be mentioned. The mixing is carried out usually within the range of room temperature to 60° C., for 10 minutes to several hours.

<The Spray Drying Step>

Next, the above mentioned obtained slurry is granulated by spray drying so as to obtain the composite particle. The spray drying is performed by spraying the slurry in hot air for drying. As for an apparatus for spraying the slurry, an atomizer is exemplified. There are two kinds of the atomizer such as a rotary disk type and a pressurizing type. The rotary disk type is that the slurry is introduced into almost center of a disk which rotates at high speed, the slurry is released to outside of the disk by a centrifugal force of the disk, at this time the slurry is atomized. Although a rotating speed of the disk depends on a size of the disk, normally 5,000 to 30,000 rpm, preferably 15,000 to 30,000 rpm. When the rotating speed is lower, the spray drop becomes larger, and the volume average particle size of the obtainable composite particle becomes larger. As for the rotating disk type atomizer, although a pin type and a vane type atomizer are exemplified, the pin type atomizer is preferred. The pin type atomizer is one of a centrifugal type atomizer which uses a spray disc, said spray disc is composed of a plurality of rollers for spraying detachably mounted on almost concentric circle along a circumference between an upper and lower mounting discs. The slurry is introduced from a center of the spraying disc and adheres to the spraying rollers by a centrifugal force and moved toward an outside on a roller surface, and finally removed from the roller surface so as to be sprayed. On the other hand, the pressurizing type is a drying method to spraying the slurry from a nozzle by pressure.

Although a temperature of the sprayed slurry is normally a room temperature, it may be higher than the room temperature by heating. Also, a hot air temperature when spray drying is normally 80 to 250° C., preferably 100 to 200° C. In the spray drying, a method for blowing the hot air is not particularly limited, for example, a co-current flow method wherein the hot air and spraying direction are co-current to a lateral direction, a method that sprayed at a drying overhead portion and descends with the hot air, a method that the sprayed drop and the hot air are counter concurrent contacting, a method that the sprayed drop concurrent flows with the hot air firstly, then counter concurrent contacts by gravity falling and the like are exemplified.

The spherical composite particle obtained by the above mentioned production method can be carried out with the after treatment after the production if necessary. Specifically, the particle surface is modified by mixing the above mentioned porous carbon material, the conductive agent, the binder and the additives or so to the spherical composite particle; thereby the fluidity of the spherical composite particle can be improved, the continuous pressure applying molding property can be improved or reduced, the electric conductivity of the spherical composite particle can be improved, and the gas generation while the lead acid battery is working can be suppressed.

The volume average particle diameter of the spherical composite particle used suitably in the present invention is usually 0.1 to 1,000 µm, preferably 5 to 500 µm, and more preferably 10 to 100 µm. When the volume average particle diameter of the spherical composite particle is within this range, the spherical composite particle becomes difficult to coagulate, easier to handle, and easier to form the active material electrode layer, hence it is preferable. The volume average particle diameter can be measured by the laser diffraction particle size analyzer.

<The Current Collector>

The current collector used in the present invention is not particularly limited as long as it allows the electrode active material and the external devices to have the electric conductivity; however the grid shape current collector is preferable since it has good holding of the electrode active material layer and the current collecting property. As the grid shape current collector, the standard grid, the radial grid, and the expand type may be used.

As the material of the grid shape current collector, the lead containing alloy such as the lead-calcium alloy, the lead-antimon alloy, the lead-tin alloy or so is used. As a part of the composition of said lead alloy, arsenic, tin, copper, silver, and aluminum or so may be included.

<The Lead Acid Battery>

The lead acid battery of the present invention is the lead acid battery using above mentioned lead acid battery electrode to at least either of the positive electrode or the negative electrode. As for the lead acid battery of the present invention, the electrode of the present invention is preferably used to either one of the positive electrode or the negative electrode, and it is preferably used to only to the negative electrode from the point of the productivity. The lead acid battery usually has plurality of pairs of the electrode pairs placed in which the positive electrode and the negative electrode face each other via the separator, and each positive electrode is constructed to have electrical contact and each negative electrode is constructed to have electrical contact.

In the lead acid battery of the present invention, as the constitution element of other than said electrodes, the separator, the electrolyte solution, and the battery container for placing these and the cover may be mentioned, as the usual lead acid battery.

<The Electrolyte Solution>

As the electrolyte solution used in the lead acid battery of the present invention, usually sulfuric acid solution may be used. The density of the sulfuric acid changes depending on the charge-discharge status, however after the chemical treatment of the lead acid battery, the density is preferably 1.25 to 1.30 g/cm$^3$ (20° C.) at fully charged status.

<The Separator>

As the separator used in the lead acid battery of the present invention, the separator such as the conventionally known paper, the fine porous polyethylene, the fine porous polypropylene, the fine porous rubber, the retainer mat, the glass mat, the glass fiber or so may be used alone or by combining plurality thereof.

<The Battery Container and the Cover>

In the lead acid battery of the present invention, the conventionally known battery container containing the electrolyte solution and the electrode pairs placed so that the positive electrode and the negative electrode face each other via the separator, and the cover can be used. Specifically, those which uses ethylene-propylene copolymer, polyethylene, polypropylene, polyacrylonitrile-styrene copolymer, polyacrylonitrile-butadiene-styrene copolymer as the material can be used.

<The Battery Pack>

As same as the conventionally known lead acid battery, plurality of the lead acid battery which comprises the above mentioned plurality of electrode pairs constructed so that each positive electrode and the negative electrodes to have electrical contact are prepared, and may be connected in series circuit. Thereby, the electromotive force of the entire lead acid battery can be enlarged. There is no need to prepare for plurality of battery containers for connecting in series circuit, the plurality of partition is provided in one battery container, and the above mentioned electrode pair is placed in each of the partition, and by connecting in series circuit, the lead acid battery having the high electric power can be produced as a whole.

EXAMPLE

Hereinafter, the present invention will be described based on the examples and the comparative examples, however the present invention is not limited thereto. Note that, "parts" and "%" in the examples and the comparative examples are based on the weight unless mentioned otherwise.

The measuring and the evaluation of the characteristic of the examples and the comparative examples were carried out in the following method.

(The Spherical Degree)

The evaluation of the spherical degree of the composite particle was carried out by the following method.

In regards with 100 arbitrary spherical composite particle measured by the photographic images which observed the obtained composite particle using the reflection electron microscope, the short the axis diameter is Ls, and the long axis diameter is L1, then each spherical degree was obtained from the formula of $(L1-Ls)/\{(Ls+L1)/2\}\times 100$; thereby the average value of the obtained 100 composite particles were determined as the spherical degree (%) of the composite particle. As this value is smaller, it indicates that the composite particle is closer to complete sphere.

(The Average Particle Diameter)

The average particle diameter of the composite particle is the average particle diameter of the particle diameter of the 50% cumulative frequency based on the volume particle size distribution measured at 23° C. using the laser diffraction particle size analyzer SALD-3100 and the injection type dry measurement unit DS-21 made by Shimadzu Corporation.

(The Output Characteristic)

The voltage which is the 0.2 seconds after the multilayered lead acid battery has discharged at 20 CA from the charge voltage of 2.2V at 25° C. was measured and the relative value with respect to the comparative example 1 was determined as the output characteristic before the cycle test (the initial output characteristic). Here, 20 CA refers to the amount of the electrical current needed for discharging the capacity of the produced battery by 1/20 hours. The higher the voltage value is, it indicates that it is good in instantaneous large current discharge. This multilayered lead acid battery was subject to 200 repeats of the charge-discharge cycle by the electrical current of 5 C starting from 2.2V of charged voltage until the SOC became 70%. Then, the voltage f which is the voltage after 0.2 seconds of discharge at 20 CA from 2.2V of charged voltage was measured, and the output characteristic after the cycle was determined as the relative value with respect to the voltage i which is before the cycle test of the comparative example 1. The output maintaining rate was determined by (the output characteristic after the cycle)/(initial output characteristic).

Example 1

The Positive Electrode Production 100 parts of lead oxide as the electrode active material, 10 parts of ion exchange water and 10 parts of diluted sulfuric acid having 1.27 gravity were mixed, and made the positive electrode composite paste. After filling this paste to the grid shape current collector (100 mm×100 mm×1 mm) formed by lead-calcium alloy, it is aged for 24 hours under the atmosphere of 95% humidity at 40° C., then by drying the positive electrode of non-chemically converted was produced. When B/(A+B)×100 of this positive electrode is calculated, it is 0%.

(The Negative Electrode)

0.3 parts of carbon black as the conductive agent, 0.3 parts of barium sulfate, 0.6 parts of polyester fiber, 10 parts of ion exchange water, and 10 parts of diluted sulfuric acid having 1.36 gravity were added to 100 parts of lead oxide as the lead containing material and mixed to obtain zinc oxide paste. This paste was passed through the fixed gap roll to form the sheet form paste having the thickness of 900 μm. This sheet form paste is filled into the grid shape current collector (100 mm×100 mm×1 mm) formed by lead-calcium alloy thereby obtained the lead active material layer.

100 parts of water vapor activated active carbon having the specific surface are of 1700 m$^2$/g as the porous carbon material, 5 parts of carbon black as the conductive agent, 1.5 parts of carboxymethylcellulose sodium salt as the disperser, 10 parts in terms of solid portion of the aqueous dispersion of styrene-butadiene copolymer particle (the solid portion concentration 40%, the butadiene amount 50 wt %, the glass transition temperature −20° C.) as the binder were added so that the solid portion concentration becomes 20% and the ion exchange water were added, and obtained the slurry by carrying out the dispersion mixing. To this slurry, the spray drying granulation was carried out by the atomizer (the diameter of 65 mm) of the rotation disk type having the rotation speed of 25,000 rpm, the hot air temperature of 150° C., and the particle collecting outlet temperature of 90° C. using the spray drying machine; thereby the spherical composite particle was obtained. The volume average particle diameter was 54 μm, and the spherical degree was 11%.

The spherical composite particle was carried out with the sheet molding by the pressure roller (100° C., 20 m/min, 5 kN/cm) heated at 100° C.; thereby obtained the sheet form molding having the thickness of 100 μm, the density of 0.60 g/cm$^3$. This sheet molding was pressure adhered by the batch press to the one surface of the current collector filled with said paste at 100° C., 10 MPa to form the porous carbon active material layer and produced the negative electrode. When B/(A+B)×100 of this negative electrode was calculated, it was 1.7%. The ratio of the porous carbon material in the porous carbon active material layer was 86%.

Figure 3:
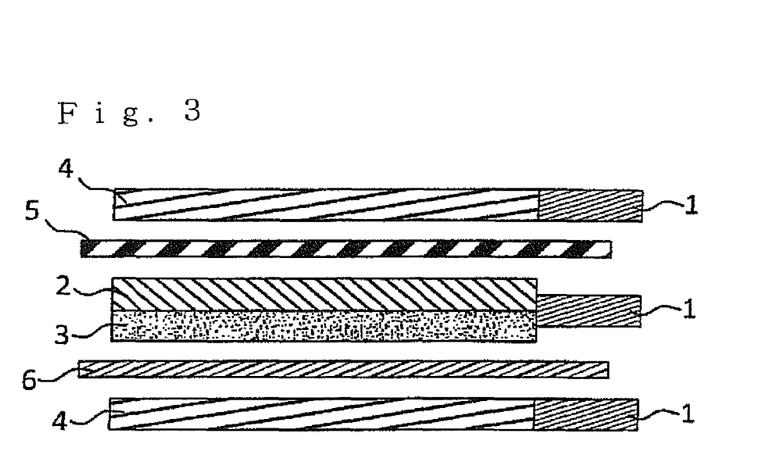
FIG. 3 is a schematic cross section showing one embodiment of lead acid battery according to the examples and the comparative examples.

By using the above mentioned positive electrode and the negative electrode, the multilayered lead acid battery shown in FIG. 3 was made.

As for the separator, the separator 5 made of the glass micro fiber was placed between the lead active material layer 2 and the positive electrode (the positive electrode active material layer 4+the grid shape current collector 1); and the separator 6 made of fine porous poly propylene was placed between the porous carbon active material layer 3 and the positive electrode (the positive electrode active material layer 4+the grid shape current collector 1). As for the electrolyte solution, the diluted sulfuric acid having 1.225 gravity (20° C.) was used. The sulfuric acid having the density of 1.4 g/cm$^3$ was used to control so that the density of the electrolyte solution becomes 1.28 g/cm$^3$ after carrying out the over charge and the chemical treatment to the above mentioned; thereby the lead acid battery was obtained. The output characteristic before and after the charge-discharge cycle of this lead acid battery was evaluated.

Example 2

The thickness of the lead oxide paste having the sheet form in the example 1 was made into 820 μm, and by having 18 m/min of the molding speed and 7 kN/cm of the press line pressure between the rolls during the roll pressure when molding the spherical composite particle, the sheet molding having the thickness of 180 μm and the density of 0.70 g/cm$^3$ was obtained. Other than that, the negative electrode and the lead acid battery was obtained as same as the example 1. When B/(A+B)×100 of this negative electrode was calculated, it was 3.9%. The output characteristic before and after the charge-discharge cycle of this lead acid battery was evaluated.

Example 3

The thickness of the lead oxide paste having the sheet form in the example 1 was made into 780 μm, and by having 16 m/min of the molding speed and 5.5 kN/cm of the press line pressure between the rolls during the roll pressure when molding the spherical composite particle, the sheet molding having the thickness of 220 μm and the density of 0.65 g/cm$^3$ was obtained. Other than that, the negative electrode and the lead acid battery was obtained as same as the example 1. When B/(A+B)×100 of this negative electrode was calculated, it was 4.6%. The output characteristic before and after the charge-discharge cycle of this lead acid battery was evaluated.

Example 4

The thickness of the lead oxide paste having the sheet form in the example 1 was made into 600 μm, and by having 10 m/min of the molding speed and 4 kN/cm of the press line pressure between the rolls during the roll pressure when molding the spherical composite particle, the sheet molding having the thickness of 400 μm and the density of 0.50 g/cm$^3$ was obtained. Other than that, the negative electrode and the lead acid battery was obtained as same as the example 1. When B/(A+B)×100 of this negative electrode was calculated, it was 8.1%. The output characteristic before and after the charge-discharge cycle of this lead acid battery was evaluated.

Example 5

The thickness of the lead oxide paste having the sheet form in the example 1 was made into 420 μm, and by having 8 m/min of the molding speed and 4 kN/cm of the press line pressure between the rolls during the roll pressure when molding the spherical composite particle, the sheet molding having the thickness of 580 μm and the density of 0.50 g/cm$^3$ was obtained. Other than that, the negative electrode and the lead acid battery was obtained as same as the example 1. When B/(A+B)×100 of this negative electrode was calculated, it was 15.5%. The output characteristic before and after the charge-discharge cycle of this lead acid battery was evaluated.

Example 6

The thickness of the lead oxide paste having the sheet form in the example 1 was made into 300 μm, and by having 7 m/min of the molding speed and 4.5 kN/cm of the press line pressure between the rolls during the roll pressure when molding the spherical composite particle, the sheet molding having the thickness of 700 μm and the density of 0.55 g/cm$^3$ was obtained. Other than that, the negative electrode and the lead acid battery was obtained as same as the example 1. When B/(A+B)×100 of this negative electrode was calculated, it was 25.4%. The output characteristic before and after the charge-discharge cycle of this lead acid battery was evaluated.

Example 7

The thickness of the lead oxide paste having the sheet form in the example 1 was made into 50 μm, and by having 5 m/min of the molding speed and 43 kN/cm of the press line pressure between the rolls during the roll pressure when molding the spherical composite particle, the sheet molding having the thickness of 950 μm and the density of 0.42 g/cm$^3$ was obtained. Other than that, the negative electrode and the lead acid battery was obtained as same as the example 1. When B/(A+B)×100 of this negative electrode was calculated, it was 67.9%. The output characteristic before and after the charge-discharge cycle of this lead acid battery was evaluated.

Example 8

The aqueous dispersion of styrene-butadiene copolymer particle (the solid portion concentration 40%, butadiene amount 50 wt %, the glass transition temperature −20° C.) used in example 1 was changed to the aqueous dispersion of acrylonitrile/butadiene copolymer (the solid portion concentration 40%, the butadiene amount 55 wt %, the glass transition temperature −8° C.), other than that the spherical composite was obtained as same as the example 1. The volume average particle diameter of this spherical composite particle was 60 μm, and the spherical degree was 9%. This spherical composite particle was carried out with sheet molding pressure roll heated at 100° C. (100° C., 12 m/min, 4 kN/cm), thereby obtained the sheet form molding having the thickness of 400 μm, the density of 0.50 g/cm³. This sheet molding was pressure adhered as same as the example 1, and formed the porous active material layer thereby produced the negative electrode. When B/(A+B)×100 of this negative electrode was calculated, it was 8.1%. The output characteristic before and after the charge-discharge cycle of this lead acid battery was evaluated.

Comparative Example 1

The thickness of the lead oxide paste having the sheet form in the example 1 was made into 780 μm, and by having 14 m/min of the molding speed and 9.5 kN/cm of the press line pressure between the rolls during the roll pressure when molding the spherical composite particle, the sheet molding having the thickness of 220 μm and the density of 0.82 g/cm³ was obtained. Other than that, the negative electrode and the lead acid battery was obtained as same as the example 1. When B/(A+B)×100 of this negative electrode was calculated, it was 5.8%. The output characteristic before and after the charge-discharge cycle of this lead acid battery was evaluated.

Comparative Example 2

100 parts of lead oxide, 0.060 parts of polyester fiber, 0.493 parts of barium sulfate, 0.026 parts of carbon black, 7.98 parts of diluted sulfuric acid having the density of 1.400 g/cm³ and 11 parts of water were prepared, and this paste was filled to the grid shape current collector (100 mm×100 mm×1 mm) so that the thickness becomes to 570 μm. The water was added to 20 parts of carbon black having the specific area of 60 m²/g, 7.5 parts of carboxymethyl cellulose, 7.5 parts of polychloroprene, and 65 parts of activated carbon having the specific surface area of 2,000 m²/g (made by KURARAY CHEMICAL CO., LTC) to form the paste, and this was filled to the one surface of said grid shape current collector so that after the coating has the thickness of 430 μm and the density of 0.38 g/cm³; thereby the negative electrode was produced. When B/(A+B)×100 of obtained negative electrode was calculated, it was 7.8%. Then, the battery was made as same as the example 1 besides that this negative electrode was used as the negative electrode, and the output characteristic before and after the charge-discharge cycle of this lead acid battery was evaluated.

Comparative Example 3

100 parts of lead, 0.3 parts of lignin, 0.2 parts barium sulfate and 0.1 parts of carbon powder were added, and the polyethylene fiber was further added then kneaded for about 10 minutes. 12 parts of the water was further added to the obtained mixture, and 13 parts of sulfuric acid having the density of 1.26 g/cm³ (20° C.), thereby obtained the negative electrode active material paste. This paste was filled to the grid shape current collector (100 mm×100 mm×2.0 mm), and left for aging for 18 hours under the atmosphere at the temperature of 50° C., the humidity 98 RH %, then the lead active material layer was formed by leaving for 2 hours at 100° C. for drying. 80 parts of activated carbon powder having the specific surface area of 1,700 m²/g, 15 parts of acetylene black having the specific surface area of 65 m²/g were thoroughly mixed then 5 parts of polytetrafluoroethylene powder were added for dry kneading. This was pulverized by cutter mixer to obtain the powder. This powder had the average particle diameter of 161 μm, and the spherical degree was 0.43. The obtained powder was adhered using the hydraulic press having the pressure of 50 MPa to the one surface of the grid shape current collector filled with said negative electrode paste. Note that the amount of the powder is controlled to have 0.7% of B/(A+B)×100 of the negative electrode when pressure molding. Then, the battery was made as same as the example 1 besides that this negative electrode was used as the negative electrode, and the output characteristic before and after the charge-discharge cycle of this lead acid battery was evaluated. Note that, the thickness of the molding of the powder (the porous carbon active material layer) was 6 μm and the density was 0.65 g/cm³.

Comparative Example 4

92 parts of activated carbon powder having the specific surface area of 1,700 m²/g and 8 parts of powder polyethylene were mixed, and this was filled to the grid shape current collector so that the thickness becomes 1,000 μm, and the negative electrode was obtained by sintering. The density of the obtained active material layer is 0.60 g/cm³. When B/(A+B)×100 of obtained negative electrode was calculated, it was 100%. Then, the battery was made as same as the example 1 besides that this negative electrode was used as the negative electrode, and the output characteristic before and after the charge-discharge cycle of this lead acid battery was evaluated.

Hereinabove, the output characteristic of the examples and the comparative examples are shown in Table 1 as the relative value with respect to the initial output characteristic of the comparative example 1, the output characteristic after the charge-discharge cycle, and the maintaining rate with respect to the initial output characteristic of the output characteristic after the charge-discharge cycle. It indicates that the larger the initial output characteristic and the cycle maintaining rate is, the larger the output characteristic after the charge-discharge cycle is, which is preferable.

TABLE 1

|  | Example 1 | Example 2 | Example 3 | Example 4 | Example 5 | Example 6 | Example 7 |
|---|---|---|---|---|---|---|---|
| B/(A + B) × 100 (%) | 1.7 | 3.9 | 4.6 | 8.1 | 15.5 | 25.4 | 67.9 |
| The layer including the porous carbon active material | | | | | | | |
| The density (g/cm3) | 0.60 | 0.70 | 0.65 | 0.50 | 0.50 | 0.55 | 0.42 |
| The thickness (μm) | 100 | 180 | 220 | 400 | 580 | 700 | 950 |
| The output characteristic | | | | | | | |
| The initial output characteristic (%) | 105 | 107 | 119 | 124 | 110 | 113 | 112 |
| The power output after the cycle (%) | 89 | 90 | 101 | 104 | 91 | 90 | 88 |
| The output maintaining rate (%) | 85 | 84 | 85 | 84 | 83 | 80 | 79 |

TABLE 1-continued

|  | Example 8 | Comparative example 1 | Comparative example 2 | Comparative example 3 | Comparative example 4 |
|---|---|---|---|---|---|
| B/(A + B) × 100 (%) | 8.1 | 5.8 | 7.8 | 0.7 | 100 |
| The layer including the porous carbon active material | | | | | |
| The density (g/cm3) | 0.50 | 0.82 | 0.38 | 0.65 | 0.60 |
| The thickness (μm) | 400 | 220 | 430 | 6 | 1000 |
| The output characteristic | | | | | |
| The initial output characteristic (%) | 128 | 100 | 95 | 85 | 85 |
| The power output after the cycle (%) | 106 | 85 | 74 | 71 | 75 |
| The output maintaining rate (%) | 83 | 85 | 78 | 84 | 88 |

The comparative example 1 is poor in the output characteristic after the cycle with respect to the examples, since the liquid holding of the electrolyte solution is not sufficient due to the large electrode density of the porous carbon electrode layer.

The comparative example 2 has the small density of the porous carbon active material layer, hence the binding between the porous carbon materials in the porous carbon active material layer is not sufficient; further, the electrical conductivity is insufficient plus the porous carbon active material layer cannot catch up with the morphological changes of the electrode during the charge-discharge cycle, thus the output characteristic after the charge-discharge cycle was particularly poor. The comparative example 3 has small value of B/(A+B)×100, hence the initial output characteristic is small, and further the output characteristic after the cycle is poor. The comparative example 4 has 100% of B/(A+B)×100, hence the initial output characteristic is small and further the output characteristic after the cycle is poor.

Among the examples, the examples (the examples 3, 4, and 8) having the value of B/(A+B)×100 with in the range of 4.0 to 15%, the density of the porous carbon active material layer in the range of 0.50 to 0.65 g/cm³, and the thickness of the porous carbon active material layer within the range of 200 to 400 μm show particularly significant initial output characteristic and the output maintaining rate.

INDUSTRIAL APPLICABILITY

The lead acid battery electrode of the present invention and the lead acid battery using thereof show significant output characteristic after several times of charge-discharge cycle, hence it can be suitably used to the lead acid battery for the idle-stop car, the lead acid battery for the hybrid automobile, and the lead acid battery for the electric power storage of the wind power generation or the solar power generation.

Hereinabove, the present invention was described in connection with the embodiment which is thought to be the most practical and suitable; however the present invention is not to be limited to the embodiment described in the present application, and the present invention can be modified as long as it does not exceed the scope of subject and the idea of the invention which can be understood from the claims and the application as a whole. Also, the technical scope of the present invention includes the lead acid battery electrode having such modification.

EXPLANATION OF THE NOTES

1: The grid shape current collector
2: The lead active material layer
3: The porous carbon active material layer
4: The positive electrode active material layer
5: The separator made by glass microfiber
6: The separator made by the fine porous polypropylene

The invention claimed is:

1. A lead acid battery electrode comprising an electrode active material layer including a layer including a lead containing material as an electrode active material and a layer including porous carbon material as an electrode active material, and a current collector; wherein
when a weight of lead atoms contained in said electrode active material layer is A, and a weight of the porous carbon material contained in said electrode active material layer is B, then B/(A+B)×100 is 1.5 to 70.0%,
a density of said layer including the porous carbon material is 0.40 to 0.80 g/cm³, and
the layer including the lead containing material as the electrode active material and the layer including porous carbon material as the electrode active material are different layers.

2. The lead acid battery electrode as set forth in claim 1, wherein a thickness of said layer including the porous carbon material is 600 μm or less.

3. The lead acid battery electrode as set forth in claim 1 or 2, wherein said layer including the porous carbon material is the layer formed by spherical composite particles.

4. The lead acid battery electrode as set forth in claim 1, wherein said electrode active material layer further comprises a binder.

5. The lead acid battery electrode as set forth in claim 4, wherein the binder is diene polymer.

6. The lead acid battery electrode as set forth in claim 4 or 5, wherein said binder has a glass transition temperature of −80° C. to 50° C.

7. A lead acid battery using the lead acid battery electrode as set forth in claim 1 to either one of a positive electrode or a negative electrode.

8. The lead acid battery electrode as set forth in claim 1, wherein a specific surface area of said porous carbon material is 500 m²/g or more.

9. The lead acid battery electrode as set forth in claim 1, wherein said porous carbon material is activated carbon.

10. The lead acid battery electrode as set forth in claim 1, wherein said B/(A+B)×100 is 1.5 to 15%.

* * * * *